(12) United States Patent
Onitsuka

(10) Patent No.: US 9,894,239 B2
(45) Date of Patent: Feb. 13, 2018

(54) COMMUNICATION APPARATUS, COMMUNICATION METHOD, AND NON-TRANSITORY COMPUTER READABLE MEDIUM CONTROLLING A WRITE PROCESS TO A PLURALITY OF DESTINATIONS

(71) Applicant: FUJI XEROX CO., LTD., Tokyo (JP)

(72) Inventor: Miki Onitsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/333,466

(22) Filed: Oct. 25, 2016

(65) Prior Publication Data

US 2017/0331975 A1 Nov. 16, 2017

(30) Foreign Application Priority Data

May 13, 2016 (JP) .................................. 2016-096987

(51) Int. Cl.
*G06F 3/12* (2006.01)
*H04N 1/32* (2006.01)
*H04N 1/00* (2006.01)

(52) U.S. Cl.
CPC ..... *H04N 1/32096* (2013.01); *H04N 1/00244* (2013.01); *H04N 1/00795* (2013.01); *H04N 1/32069* (2013.01); *H04N 1/32101* (2013.01); *H04N 2201/0039* (2013.01); *H04N 2201/0081* (2013.01); *H04N 2201/3202* (2013.01)

(58) Field of Classification Search
None
See application file for complete search history.

(56) References Cited

U.S. PATENT DOCUMENTS 3,824,334 A * 7/1974 Jacobson ............... H04M 11/06
358/439
2009/0244612 A1 * 10/2009 Ando .................. H04N 1/00204
358/1.15

FOREIGN PATENT DOCUMENTS

JP H08-251327 A 9/1996

* cited by examiner

*Primary Examiner* — Thomas D Lee
(74) *Attorney, Agent, or Firm* — Oliff PLC

(57) ABSTRACT

A communication apparatus includes a checking unit, a data transmitting unit, and a process history transmitting unit. The checking unit communicates with each of multiple destinations for data and checks whether or not the data is capable of being written at the destination. The data transmitting unit transmits the data to the destination on which the checking unit has performed the checking operation. The process history transmitting unit transmits a process history about the data, to the destination to which the data transmitting unit transmits the data.

5 Claims, 2 Drawing Sheets

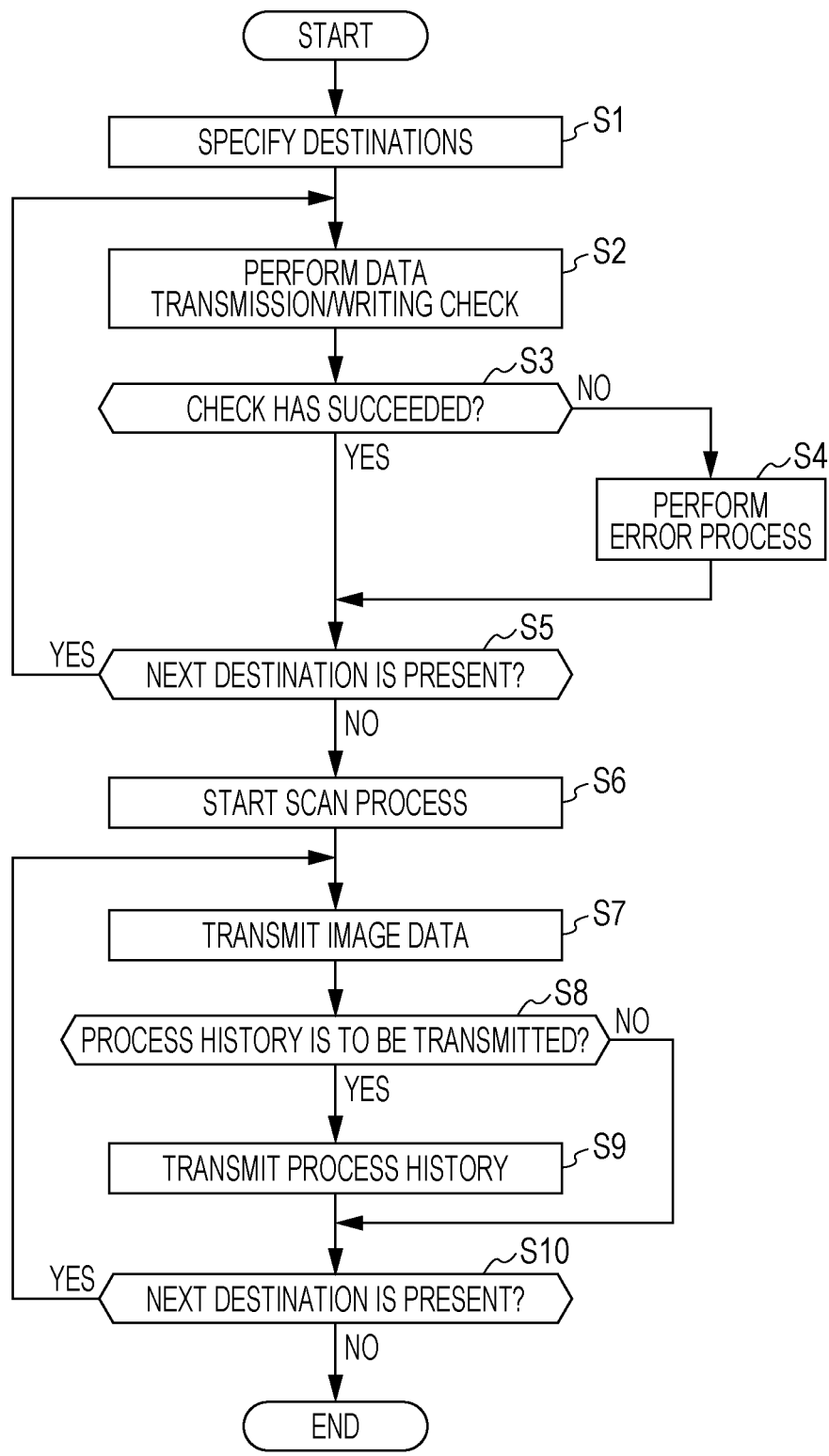

COMMUNICATION APPARATUS, COMMUNICATION METHOD, AND NON-TRANSITORY COMPUTER READABLE MEDIUM CONTROLLING A WRITE PROCESS TO A PLURALITY OF DESTINATIONS

CROSS-REFERENCE TO RELATED APPLICATIONS

This application is based on and claims priority under 35 USC 119 from Japanese Patent Application No. 2016-096987 filed May 13, 2016.

BACKGROUND

(i) Technical Field

The present invention relates to a communication apparatus, a communication method, and a non-transitory computer readable medium.

(ii) Related Art

A function called a multi-send feature in which multiple destinations are specified and in which a single reading operation on a document causes data to be transferred to the multiple destinations has been used. By using the multi-send feature, in the case where a user uses a scanner to specify multiple destinations and starts an operation of reading a document, the user may take out the document when the reading operation ends, and may leave the scanner. The scanner transmits, to each of the destinations, a process history about the process of reading data transmitted to the destination. The user may refer to the process history by accessing each destination by using his/her communication terminal. However, the process histories are distributed to the destinations, resulting in lack of an at-a-glance property in terms of a checking operation in which it is checked if all of the multiple destinations have received the process histories.

SUMMARY

According to an aspect of the invention, there is provided a communication apparatus including a checking unit, a data transmitting unit, and a process history transmitting unit. The checking unit communicates with each of multiple destinations for data and checks whether or not the data is capable of being written at the destination. The data transmitting unit transmits the data to the destination on which the checking unit has performed the checking operation. The process history transmitting unit transmits a process history about the data, to the destination to which the data transmitting unit transmits the data.

BRIEF DESCRIPTION OF THE DRAWINGS

Exemplary embodiment of the present invention will be described in detail based on the following figures, wherein:

FIG. 4 is a flowchart of operations performed by the image forming apparatus.

DETAILED DESCRIPTION

Figure 1:
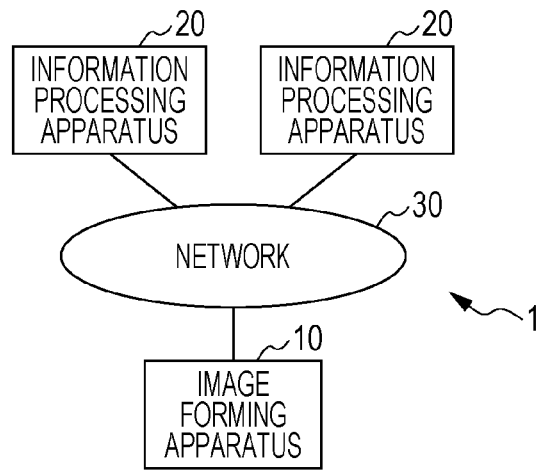
FIG. 1 is a diagram illustrating the configuration of a communication system.

An exemplary embodiment of the present invention will be described.
Configurations
FIG. 1 is a block diagram illustrating the overall configuration of a communication system 1 according to the exemplary embodiment of the present invention. The communication system 1 includes an image forming apparatus 10 serving as a communication apparatus, multiple information processing apparatuses 20 serving as destinations for data transmitted from the image forming apparatus 10, and a network 30 such as a local area network (LAN) which communicatively connects the image forming apparatus 10 to the information processing apparatuses 20. Each of the information processing apparatuses 20 may be a server other than the image forming apparatus 10, or may be any apparatus as long as it is an information processing apparatus that receives and stores data, such as a personal computer or a server.

Figure 2:
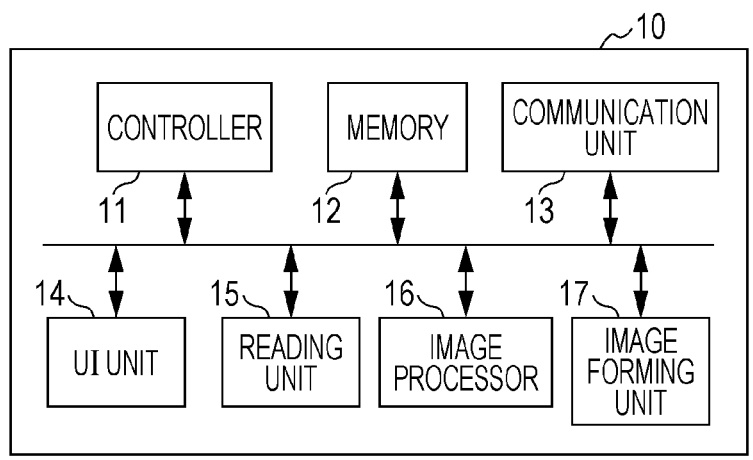
FIG. 2 is a diagram illustrating the hardware configuration of an image forming apparatus.

FIG. 2 is a diagram illustrating the hardware configuration of the image forming apparatus 10. The image forming apparatus 10 is an exemplary communication apparatus provided for the present invention. The image forming apparatus 10 includes a controller 11, a memory 12, a communication unit 13, a user interface (UI) unit 14, a reading unit 15, an image processor 16, and an image forming unit 17.

The controller 11 which includes an arithmetic unit such as a central processing unit (CPU) and storage units, such as a read-only memory (ROM) and a random access memory (RAM), implements functions described below. In the ROM, firmware in which how to activate hardware and an operating system (OS) is described is stored. The RAM is used for data storage when the CPU executes calculation. The memory 12 which includes, for example, a semiconductor memory and a hard disk storage unit is used to store not only the OS but also application programs for implementing various functions. The communication unit 13 is provided with a communication interface (I/F) for communicating with external electronic equipment. The communication unit 13 is connected to the network 30.

The UI unit 14 includes a display unit and an operation unit. The display unit which includes, for example, a liquid-crystal display apparatus displays, on a display surface, a screen for a user to operate the image forming apparatus 10. The operation unit includes, for example, a touch panel disposed so as to cover the display surface of the display unit and a keyboard disposed close to the display surface. The operation unit receives an operation performed by a user and outputs, to the controller 11, a signal according to the operation. The controller 11 controls the image forming apparatus 10 in accordance with the operation.

The reading unit 15 optically reads a document and generates image data. The reading unit 15 is, for example, an image scanner provided with platen glass, a light source, an optical system, a color filter, imaging devices, and the like. In the reading unit 15, the light source emits light to a document on the platen glass, and the imaging devices receive light reflected from the document, through the optical system and the color filter. The imaging devices convert incident light into an image signal which is output to the image processor 16. The image processor 16 performs image processing, such as screen processing and color conversion, on the image signal which is output from the reading unit 15, and generates raster data. The image forming unit 17 forms an image based on the raster data generated by the image processor 16, on a sheet which is a recording medium. The image forming system is, for example, an electrophotographic system or an inkjet system.

In the exemplary embodiment, a function called a multi-send feature in which multiple destinations are specified in the image forming apparatus 10 and in which image data obtained through a single reading operation on a document is transferred to the multiple destinations is implemented. By using the multi-send feature, in the case where a user uses the image forming apparatus 10 to specify multiple destinations and starts an operation of reading a document, the user may take out the document when the reading operation ends, and may leave the image forming apparatus 10. The image forming apparatus 10 transmits the image data to each of the destinations over the network 30 and transmits a process history about the process performed on the data transmitted to the destination, more specifically, a process history including various parameters used in the process of reading a document. The process history is transmitted just after the image data is transmitted. The information processing apparatus 20 corresponding to each of the destinations uses the process history, for example, to control the storage location of the received image data and/or change the file name of the received image data.

The user may access the information processing apparatuses 20 corresponding to the destinations over the network 30 by using his/her communication terminal (not illustrated), and may check the process histories stored in the information processing apparatuses 20. Thus, the user may check if the series of processes from the document reading process to transmission of the process histories are completed.

When image data and a process history fails to be transmitted to the information processing apparatus corresponding to a certain destination, for example, due to congestion of the network 30 or the like, the image data and the process history are not present at the destination. Therefore, the user has no way of checking if the series of processes from the document reading process to transmission of image data and a process history to the destination are completed.

Figure 3:
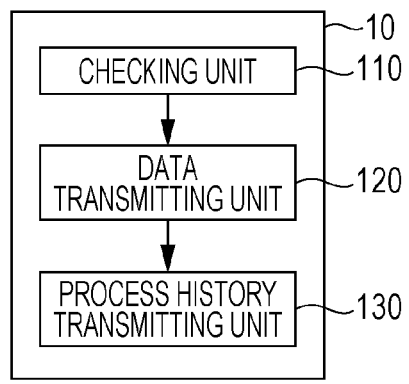
FIG. 3 is a diagram illustrating the functional configuration of the image forming apparatus.

To address this issue, the image forming apparatus 10 implements functions, i.e., a checking unit 110, a data transmitting unit 120, and a process history transmitting unit 130 as illustrated in FIG. 3. The checking unit 110 communicates with a destination for image data, and checks that data may be written at the destination. More specifically, the checking unit 110 requests the information processing apparatus 20 corresponding to a destination to create a file in which a process history is to be stored. By receiving the result (indicating whether or not the file has been created) from the destination, the checking unit 110 checks whether or not data may be written at the destination. The data transmitting unit 120 transmits image data to the destination on which the checking unit 110 has performed the checking operation. The process history transmitting unit 130 transmits a process history for data, to the destination to which the data transmitting unit 120 has transmitted the data.

Operations

Operations according to the exemplary embodiment will be described. In FIG. 4, the controller 11 receives user operations for setting various parameters used in a reading process and specifying destinations, on a setting screen displayed on the UI unit 14 (step S1). Examples of the parameters which are input in this stage include monochrome/color, a resolution, and a data format. The user may make, for each destination, a setting for leaving or not leaving a process history in this stage, or may have made the setting at a timing before step S1.

In response to a user operation of starting the process, the controller 11 performs a data transmission/writing check on each destination (step S2). Specifically, the controller 11 transmits, to the first destination, a request to create a file in which a process history is to be stored. Upon reception of a notification that a file has been successfully created, from the first destination as a response to the request, the controller 11 determines that the data transmission/writing check has succeeded at the first destination (YES in step S3). If the second destination is present (YES in step S5), the controller 11 performs the processes in steps S2 and S3 described above, on the second destination. In contrast, if the controller 11 fails to receive the notification that a file has been successfully created, from the first destination as a response to the request (NO in step S3), the controller 11 performs an error process in which, for example, a predetermined error message is displayed on the UI unit 14 (step S4), and performs the processes in steps S2 and S3 described above, on the second destination. The transmission order for the request to the multiple destinations may be any.

Thus, if the controller 11 has performed the data transmission/writing check on all of the destinations (NO in step S5), the controller 11 controls the reading unit 15 and starts a scan process in which a document is read (step S6). The controller 11 transmits, to the first destination, image data generated through reading of the document according to the parameters which have been set (step S7). The controller 11 determines whether or not a process history is to be transmitted to the first destination, from the information about the above-described setting (step S8). If a process history is to be transmitted (YES in step S8), the controller 11 transmits a process history about the image data to the first destination (step S9). The process history includes, for example, not only the above-described parameters which are monochrome/color, a resolution, a data format, and the like, but also the name of a protocol used in the data transmission, the data format of the image data, and the like.

If the second destination is present (YES in step S10), the controller 11 transmits the image data to the second destination (step S7). The controller 11 determines whether or not a process history is to be transmitted to the second destination (step S8). If a process history is to be transmitted (YES in step S8), the controller 11 transmits the process history to the second destination (step S9). The controller 11 repeatedly performs the procedure, and transmits the image data and the process histories to all of the destinations.

According to the exemplary embodiment, before the process is started, communication is performed with a destination for image data, and it is checked if data may be written. Data used in the data writing check is a file in which a process history is to be stored, achieving an advantage that a useless file is not left at each of the destinations.

The controller 11 (checking unit 110) may perform the check by requesting a destination to create a directory and receiving the result from the destination. For example, the controller 11 transmits, to the information processing apparatus 20 corresponding to a destination, a request to create a lock directory on which exclusive access control is performed. Upon reception of a notification that a lock directory has been successfully created, from the destination as a response to the request, the controller 11 determines that the data transmission/writing check has succeeded for the destination.

Before a scan process is started, the file or the directory which is used to check if a connection for communication has been established with a destination for image data and if data may be written may be deleted from an information processing apparatus 20 upon reception of a delete notification transmitted from the image forming apparatus 10 to the information processing apparatus 20. The file and the directory in this case are a file and a directory in which the process history is not stored.

The destination for image data and that for a process history are not necessarily the same information processing apparatus. The information processing apparatus corresponding to a destination for image data may be different from the information processing apparatus corresponding to a destination for the process history.

The received/transmitted data is not limited to image data. Therefore, a process history does not necessarily include parameters used when a document is read.

In the above-described exemplary embodiment, the example in which the controller 11 executes a program so as to achieve the above-described functions is described. The above-described functions may be implemented by using hardware circuits. The program may be provided by recording the program in a computer-readable recording medium, such as an optical recording medium or a semiconductor memory, and may be read from the recording medium so that the program is installed in a communication apparatus. Alternatively, the program may be provided through a telecommunication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
   a processor configured to perform as:
      a checking unit that performs a checking operation by communicating with each of a plurality of destinations for data and that checks whether or not the data is capable of being written at the destination;
      a data transmitting unit that transmits the data to the destination on which the checking unit has performed the checking operation; and
      a process history transmitting unit that transmits a process history about the data, to the destination to which the data transmitting unit transmits the data,
      wherein the checking unit requests the destination to create a directory, and performs the checking operation by receiving, from the destination, a result for the request, and
      wherein whether or not the process history is to be transmitted has been set for each of the plurality of destinations, and the process history transmitting unit transmits the process history to the destination to which the process history is to be transmitted.

2. The communication apparatus according to claim 1, wherein the directory is a directory in which the process history is not stored.

3. A non-transitory computer readable medium storing a program causing a computer to execute a process comprising:
   performing a checking operation by communicating with each of a plurality of destinations for data and checking whether or not the data is capable of being written at the destination;
   transmitting the data to the destination on which the checking operation has been performed; and
   transmitting a process history about the data, to the destination to which the data is transmitted
   wherein the communicating includes requesting each of the plurality of destinations to create a directory, and perform the checking by receiving, from each of the plurality of destinations, a result for the request, and
   wherein whether or not the process history is to be transmitted has been set for each of the plurality of destinations, and the process history transmitting unit transmits the process history to the destination to which the process history is to be transmitted.

4. A communication method comprising:
   performing a checking operation by communicating with each of a plurality of destinations for data and checking whether or not the data is capable of being written at the destination;
   transmitting the data to the destination on which the checking operation has been performed; and
   transmitting a process history about the data, to the destination to which the data is transmitted
   wherein the communicating includes requesting each of the plurality of destinations to create a directory, and perform the checking by receiving, from each of the plurality of destinations, a result for the request, and
   wherein whether or not the process history is to be transmitted has been set for each of the plurality of destinations, and the process history transmitting unit transmits the process history to the destination to which the process history is to be transmitted.

5. A communication apparatus comprising:
   a processor configured to perform as:
      a reception unit that receives an instruction from a user to send a data to a plurality of destinations;
      a request unit that requests each of the plurality of destinations to create a file for a process history, and receives from each of the plurality of destinations a result for the request; and
      a data transmitting unit that controls transmission of the data to a destination among the plurality of destinations as a result of the request unit successfully receiving the result from the destination, and that controls not transmitting the data to the destination as a result of the request unit not successfully receiving the result from the destination.

* * * * *